(12) United States Patent
Sun

(10) Patent No.: US 10,826,417 B2
(45) Date of Patent: Nov. 3, 2020

(54) STEPPER MOTOR DRIVER FOR MECHANICAL ENGINEERING

(71) Applicant: Dongguan University Of Technology, Dongguan (CN)

(72) Inventor: Zhenzhong Sun, Dongguan (CN)

(73) Assignee: DONGGUAN UNIVERSITY OF TECHNOLOGY, Dongguan, Guangdong Province (CN)

( * ) Notice: Subject to any disclaimer, the term of this patent is extended or adjusted under 35 U.S.C. 154(b) by 71 days.

(21) Appl. No.: 16/311,127

(22) PCT Filed: Apr. 23, 2018

(86) PCT No.: PCT/CN2018/084076
§ 371 (c)(1),
(2) Date: Dec. 18, 2018

(87) PCT Pub. No.: WO2019/119696
PCT Pub. Date: Jun. 27, 2019

(65) Prior Publication Data
US 2019/0372492 A1 Dec. 5, 2019

(30) Foreign Application Priority Data
Dec. 20, 2017 (CN) .......................... 2017 1 1379325

(51) Int. Cl.
*H02P 8/14* (2006.01)
*F16B 2/06* (2006.01)
(Continued)

(52) U.S. Cl.
CPC .................. *H02P 8/14* (2013.01); *F16B 2/06* (2013.01); *H02K 16/00* (2013.01); *H02P 8/00* (2013.01)

(58) Field of Classification Search
CPC ...... H02P 8/00; H02P 8/14; H02P 8/02; H02P 8/34; F16B 2/06; G05D 17/02; G04C 3/143; H02K 16/00
See application file for complete search history.

(56) References Cited

U.S. PATENT DOCUMENTS 3,314,452 A * 4/1967 Cartwright .............. H01F 41/09
242/437.2
4,766,461 A * 8/1988 Ohtsuka ............... G03G 15/223
355/45
(Continued)

FOREIGN PATENT DOCUMENTS

CN 104040811 A 9/2014
CN 105673634 A 6/2016
(Continued)

*Primary Examiner* — Tan Le
(74) *Attorney, Agent, or Firm* — Sinorica, LLC

(57) ABSTRACT

A stepper motor driver for mechanical engineering mechanical engineering includes a bottom plate, and a placing slot formed on the upper surface of the bottom plate. Both sides of the inner wall of the placing slot inner wall are fixed by a first sliding rod; two first sliding sleeves are sheathed on a surface of the first sliding rod; two first sliding sleeves are engaged with opposite sides of the two first fixed plates respectively; two first springs are sheathed on the first sliding rod, and both ends of two first springs are fixed to the sides of the two first fixed plates away from each other and both sides of the inner wall of the placing slot respectively. The driver can be removed and replaced conveniently and quickly to achieve the effects of reducing the labor intensity, saving the working time, and improving the efficiency of replacing the driver, with the design of the first fixed plate, first spring, carrier board, third fixed plate, telescopic device and clamping plate.

6 Claims, 3 Drawing Sheets

(51) Int. Cl.
*H02P 8/00* (2006.01)
*H02K 37/00* (2006.01)
*H02K 41/03* (2006.01)
*H02K 16/00* (2006.01)

(56) References Cited

U.S. PATENT DOCUMENTS

| | | | | |
|---|---|---|---|---|
| 5,715,725 | A * | 2/1998 | Schnell | B21D 37/14 |
| | | | | 72/481.2 |
| 6,358,174 | B1 * | 3/2002 | Folsom | F16H 47/04 |
| | | | | 475/72 |
| 7,802,964 | B2 * | 9/2010 | Bouru | F01D 17/20 |
| | | | | 415/149.4 |
| 9,933,055 | B2 * | 4/2018 | Veres | H02P 8/14 |
| 2001/0022245 | A1 * | 9/2001 | Rogg | B60K 6/48 |
| | | | | 180/65.21 |
| 2019/0041804 | A1 * | 2/2019 | Takyoh | H02P 8/02 |

FOREIGN PATENT DOCUMENTS

| | | |
|---|---|---|
| CN | 205806152 U | 12/2016 |
| JP | 2001161981 A | 6/2001 |

\* cited by examiner

STEPPER MOTOR DRIVER FOR MECHANICAL ENGINEERING

FIELD OF THE INVENTION

The present invention relates to the field of machinery, and more particularly to a stepper motor driver for mechanical engineering and the stepper motor driver has a convenient-to-install feature.

BACKGROUND OF THE INVENTION

Stepper motor driver is a mechanism generally used for converting an electric pulse into an angular displacement. When a stepper driver receives a pulse signal, the stepper driver drives a stepper motor to rotate to a fixed angle in a set direction, and the stepper motor is rotated step by step to the fixed angle. The number of pulses may be controlled to control the angular displacement in order to achieve the purpose of accurate positioning. In the meantime, the frequency of the pulse may be control to control the rotational speed and acceleration of the motor in order to achieve the purposes of speed adjustment and positioning.

The stepper motor plays an indispensable role as a drive unit in mechanical engineering. At present, most drivers of the stepper motor are fixed by screws. When a driver is damaged and needs a replacement, the driver is removed manually and thus increasing the labor intensity, consuming much working time, and lowering the efficiency of replacing the driver, and thus increasing the labor intensity, consuming more working time, and lowering the efficiency of replacing the driver.

In view of the aforementioned drawbacks of the prior art, the inventor of the present invention based on years of experience to conduct extensive research and experiment, and finally provided a feasible solution to overcome the drawbacks of the prior art.

SUMMARY OF THE INVENTION

Therefore, it is a primary objective of the present invention to provide a stepper motor driver for mechanical engineering to overcome the drawbacks of the prior art, since most drivers are installed and fixed by screws, and when a driver is damaged and needs a replacement, the driver is removed manually, and thus resulting in an increased labor intensity, consuming much working time, and lowering the efficiency of replacing the driver.

To achieve the aforementioned and other objectives, the present invention provides a stepper motor driver for mechanical engineering comprising a bottom plate, characterized in that the bottom plate has a placing slot formed on the upper surface of the bottom plate, and both sides of the inner wall of the placing slot are fixedly coupled by a first sliding rod, and the first sliding rod has two first sliding sleeves sheathed on a surface of the first sliding rod and engaged with opposite sides of the two first fixed plates respectively, and two first springs are sheathed on a surface of the first sliding rod, and both ends of the two first springs are fixedly coupled to the sides of the two first fixed plates away from each other and both sides of the inner wall of the placing slot, and the upper surfaces of the two first fixed plates are fixedly coupled to the lower surfaces of two first rotating devices respectively, and the upper surfaces of the two first rotating devices are fixedly coupled to the lower surfaces of two second rotating devices by two fixed rods respectively, and the upper surfaces of the two second rotating devices are fixedly coupled to the lower surface of a carrier board, and the lower surface of the carrier board is fixedly coupled to the top of four second sliding rods, and the four second sliding rods are disposed at four corners of the lower surface of the carrier board respectively, and a second sliding sleeve is sheathed on the surfaces of four second sliding rods separately, and the four second sliding sleeves are engaged with the upper surfaces of two second fixed plates respectively, and the sides of the two second fixed plate away from each other are fixedly coupled to both sides of the inner wall of the placing slot respectively, and both left and right sides of the carrier board upper surface are fixedly coupled to a third fixed plate, and the sides of two third fixed plates away from each other are fixedly coupled to both left and right sides of the inner wall of the placing slot respectively, inner wall, and the left side of the left third fixed plate is fixedly coupled to the right side of a clamping plate through two telescopic devices, and the lower surface of the clamping plate is fixedly coupled to the upper surface of a sliding block, and the sliding block is slidably coupled into a sliding groove formed on the upper surface of the carrier board, and the upper surface of the bottom plate has a fixed block disposed at a position on the right side of the placing slot, and the upper surface of the fixed block is movably coupled to the upper surface of the cover through two hinges, and lower surface of the cover is coupled to the upper surface of the bottom plate, and right side of the cover is in an arc shape.

Preferably, both of the opposite sides of the clamping plate and the left third fixed plate have a protective pad, and the protective pad has a width equal to the width of the first fixed plate and the width of the clamping plate.

Preferably, the clamping plate has a first handle disposed on the upper surface of the clamping plate, and the cover has a second handle disposed on the left side of the upper surface, and both of the first handle and the second handle are in a semicircular ring shape.

Preferably, the telescopic device comprises a telescopic rod and a second spring, and the second spring is sheathed on a surface of the telescopic rod, and both of the telescopic rod and the second spring are fixedly coupled to the opposite sides of the clamping plate and the right third fixed plate respectively.

Preferably, the first rotating device and the second rotating device have the same structure, and the first rotating device comprises two support blocks, and the lower surfaces of the two support blocks in the first rotating device are fixedly coupled to the upper surface of the first fixed plate, and the upper surface of the support block in the second rotating device is fixedly coupled to the lower surface of the carrier board, and opposite sides of the two support blocks are fixedly coupled by a rotating shaft, and a bearing is sheathed on a surface of the rotating shaft, and the upper surface of the bearing in the first rotating device is fixedly coupled to the lower surface of the second rotating device in the bearing through the fixed rod.

Preferably, the sliding block in T-shaped and the sliding groove is T-shaped.

The stepper motor driver for mechanical engineering in accordance with the present invention has the following advantages: (1) The stepper motor driver for mechanical engineering comes with the first fixed plate, first spring, carrier board, third fixed plate, telescopic device and clamping plate, so that when the driver is placed on the carrier board and the carrier board is moved downwardly, the two first fixed plates are moved away from each other to shorten the two first springs. The first handle may be moved by a user's hand to move the clamping plate, so as to facilitate the user to place the driver. After the first handle is released, the telescopic device is stretched to allow the clamping plate to clamp the driver conveniently and fix the driver tightly. The driver can be removed and replaced more conveniently and quickly to achieve the effects of reducing the labor intensity, saving the working time, and improving the efficiency of replacing the driver. (2) The stepper motor driver for mechanical engineering comes with the second sliding rod and sliding block, and the second sliding rod is provided for fixing the carrier board and ascending or descending the carrier board more stably, and the sliding block is provided for supporting the clamping plate and moving the clamping plate more stably. (3) The stepper motor driver for mechanical engineering comes with the first spring and second spring, so that when the two first fixed plates are away from each other, the two first springs are shortened, and an impact force will be produced to provide a buffering effect when the driver is placed on the carrier board. When the clamping plate is moved to the right side, the second spring is shortened, and when the first handle is released, the second spring is stretched to move the clamping plate to the left side in order to clamp the driver by the clamping plate more conveniently. In addition, the present invention has the features of compact structure, reasonable design, and high practicality.

BRIEF DESCRIPTION OF NUMERALS IN THE FIGURES

1: Bottom plate; 2: Placing slot; 3: First sliding rod; 4: First sliding sleeve; 5: First fixed plate; 6: First spring; 7: First rotating device; 71: Support block; 72: Rotating shaft; 73: Bearing; 8: Fixed rod; 9: Second rotating device; 10: Carrier board; 11: Second sliding rod; 12: Second sliding sleeve; 13: Second fixed plate; 14: Third fixed plate; 15: Telescopic device; 151: Telescopic rod; 152: Second spring; 16: Clamping plate; 17: Sliding block; 18: Sliding groove; 19: Fixed block; 20: Hinge; 21: Cover; 22: Protective pad; 23: First handle; 24: Second handle.

DESCRIPTION OF THE PREFERRED EMBODIMENTS

The technical contents of the present invention will become apparent with the detailed description of preferred embodiments accompanied with the illustration of related drawings as follows. It is intended that the embodiments and figures disclosed herein are to be considered illustrative rather than restrictive.

Figure 1:
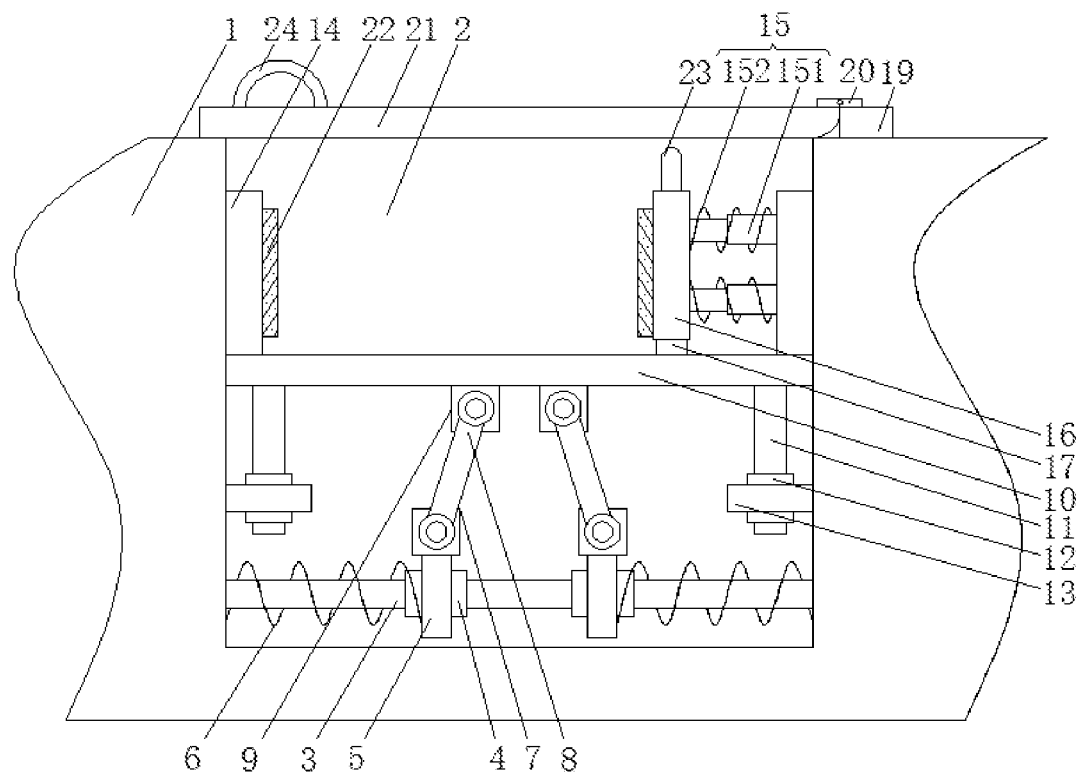
FIG. 1 is a cross-sectional front view of the present invention.
Figure 2:
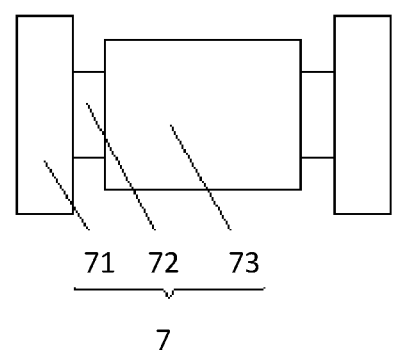
FIG. 2 is a side view of a first rotating device of the present invention.
Figure 3:
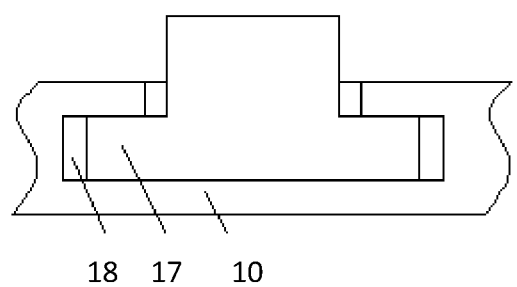
FIG. 3 is a cross-sectional side view of a sliding groove of the present invention.

With reference to FIGS. 1 to 3 for a stepper motor driver for mechanical engineering of the present invention, the stepper motor driver for mechanical engineering comprises a bottom plate 1 with a placing slot 2 formed on the upper surface of the bottom plate 1 and provided for installing the driver more conveniently, and both sides of the inner wall of the placing slot 2 are fixedly coupled by a first sliding rod 3, and two first sliding sleeves 4 are sheathed on a surface of the first sliding rod 3, and the first sliding rod 3 and the first sliding sleeve 4 are provided for fixing the first spring 6 securely. In the meantime, two first fixed plates 5 can be set apart from each other or close to each other more conveniently, and the two first sliding sleeves 4 are engaged with the opposite sides of the two first fixed plates 5 respectively, and two first springs 6 are sheathed on a surface of the first sliding rod 3, and both ends of the two first springs 6 are fixedly coupled to the sides of the two first fixed plates 5 away from each other and both sides of the inner wall of the placing slot 2 respectively, and the first spring 6 is provided, so that when the two first fixed plates 5 are moved away from each other, the two first springs 6 are shortened to produce an impact force for a buffering effect when the driver is placed onto the carrier board 10, and the upper surfaces of the two first fixed plates 5 are fixedly coupled to the lower surfaces of the two first rotating devices 7 respectively, and the upper surfaces of the two first rotating devices 7 are fixedly coupled to the lower surfaces of the two second rotating devices 9 through the two fixed rods 8 respectively, and both of the upper surfaces of the two second rotating devices 9 are fixedly coupled to the lower surface of the carrier board 10. The first rotating device 7 and the second rotating device 9 are provided for the fixed rod 8 to press and move the two first fixed plates 5 away from each other more conveniently. In the meantime, when the two first fixed plates 5 are moved close to each other, the carrier board 10 can be pushed to ascend more conveniently. The first rotating device 7 and the second rotating device 9 have the same structure, wherein the first rotating device 7 comprises two support blocks 71, and the lower surfaces of the two support blocks 71 in the first rotating device 7 are fixedly coupled to the upper surface of the first fixed plate 5, and the upper surface of the support block 71 in the second rotating device 9 is fixedly coupled to the lower surface of the carrier board 10, and the opposite sides of the two support blocks 71 are fixedly coupled by a rotating shaft 72, and a bearing 73 is sheathed on a surface of the rotating shaft 72. The bearing 73 and the rotating shaft 72 are provided for rotating the fixed rod 8 more conveniently to produce an impact force for a buffering purpose when the driver is placed onto the carrier board 10. The upper surface of the bearing 73 in the first rotating device 7 is fixedly coupled to the lower surface of the bearing 73 in the second rotating device 9 through the fixed rod 8, and the lower surface of the carrier board 10 is fixedly coupled to the top of four second sliding rods 11, and the four second sliding rods 11 are disposed at four corners of the lower surface of the carrier board 101 respectively, and a second sliding sleeve 12 is sheathed on the surfaces of four second sliding rods 11 separately, and the second sliding rod 11 is provided for fixing the carrier board 10 in order to ascend or descend the carrier board 10 more stably, and the four second sliding sleeves 12 are engaged with the upper surfaces of the two second fixed plate 13, and the sides of the two second fixed plates 13 away from each other are fixedly coupled to both sides of the inner wall of the placing slot 2 respectively, and both left and right sides of the upper surface of the carrier board 10 upper surface are fixedly coupled to a third fixed plate 14, and the sides of the two third fixed plates 14 away from each other are coupled to both left and right sides of the inner wall of the placing slot 2 respectively, and the third fixed plate 14 is provided for fixing the telescopic device 15 and clamping the driver securely by the clamping plate 16, and the left side of the left third fixed plate 14 is fixedly coupled to the right side of the clamping plate 16 through the two telescopic devices 15. The telescopic device 15 comprises a telescopic rod 151 and a second spring 152, and the second spring 152 is sheathed on a surface of the telescopic rod 151, and both ends of the telescopic rod 151 and the second spring 152 are fixedly coupled to the opposite sides of the clamping plate 16 and the right third fixed plate 14 respectively. In the telescopic rod 151 and the second spring 152, the telescopic rod 151 is provided for fixing the second spring 152 and the clamping plate 16 and the second spring 152 is shortened by its elasticity when the clamping plate 16 is moved. When the first handle 23 is released, the second spring 152 is stretched to clamp the driver better by the clamping plate 16, and both opposite sides of the clamping plate 16 and the left third fixed plate 14 have a protective pad 22, and the protective pad 22 has a width equal to the width of the first fixed plate 5 and the width of the clamping plate 16. The protective pad 22 is provided for preventing the driver from being damaged when the third fixed plate 14 and the clamping plate 16 clamp the driver tightly. The lower surface of the clamping plate 16 is fixedly coupled to the upper surface of the sliding block 17, and the sliding block 17 is slidably coupled into a sliding groove 18 formed on the upper surface of the carrier board 10, and the sliding block 17 is T-shaped, and the sliding groove 18 is T-shaped. The sliding block 17 is provided for supporting the clamping plate 16 and moving the clamping plate 16 more stably. The upper surface of the bottom plate 1 has a fixed block 19 disposed on the right side of the placing slot 2, and the upper surface of the fixed block 19 is movably coupled to the upper surface of the cover 21 through two hinges 20, and the lower surface of the cover 21 is coupled to the upper surface of the bottom plate 1, and the right side of the cover 21 is in an arc shape. The cover 21 is provided for preventing foreign matters from entering into the placing slot 2 or affecting the operation of the driver by covering the cover 21 onto the placing slot 2. The upper surface of the clamping plate 16 has a first handle 23, and the left side of the upper surface of the cover 21 has a second handle 24, and both of the first handle 23 and the second handle 24 are in a semicircular ring shape. The first handle 23 and the second handle 24 are provided for moving the clamping plate 16 by the first handle 23 more easily to facilitate placing the driver, and the second handle 24 is provided for opening or closing the cover 21 to seal the placing slot 2 better.

In the operating principle of the stepper motor driver, the cover 21 is rotated through the second handle 24, and then the first handle 23 is moved by hands in order to move the clamping plate 16 to the right side, so that the clamping plate 16 drives the sliding block 17 to move to the right side in the sliding groove 18. In the meantime, the clamping plate 16 shortens the telescopic device 15, and then the driver is placed between the left third fixed plate 14 and the clamping plate 16, and then the first handle 23 is released, so that the telescopic device 15 is stretched to move the clamping plate 16 to the left side. Therefore, the third fixed plate 14 and the clamping plate 16 can clamp and fix the driver tightly. While the driver is being placed onto the carrier board 10, the carrier board 10 moves downward to drive the two fixed rods 8 to press and move the two first fixed plates 5 away from each other, so as to shorten the two first springs 6 and produce an impact force for a buffering effect after the driver is placed onto the carrier board 10. In the meantime, the second handle 24 is provided for turning the cover 21 to seal the placing slot 2. When it is necessary to remove the driver, the second handle 24 is provided for opening the cover 21, and the first handle 23 is provided for moving the clamping plate 16 to the right side, so as to separate the clamping plate 16 from the driver and remove the driver from the placing slot 2.

In summation of the description above, the stepper motor driver for mechanical engineering comes with the first fixed plate 5, first spring 6, carrier board 10, third fixed plate 14, telescopic device 15 and clamping plate 16, so that when the driver is placed onto the carrier board 10 and the carrier board 10 is moved downwardly, the two first fixed plates 5 are moved away from each other to shorten the two first springs 6, and the first handle 23 is moved by hands to move the clamping plate 16 to facilitate placing the driver. After the first handle 23 is released, the telescopic device 15 is stretched to facilitate clamping the driver by the clamping plate 16 more conveniently. Therefore, the driver can be removed more conveniently and quickly to achieve the effects of reducing the labor intensity, saving the working time, and improving the efficiency of replacing the driver.

In addition, the stepper motor driver for mechanical engineering comes with the second sliding rod 11 and the sliding block 17, wherein the second sliding rod 11 is provided for fixing the carrier board 10 to ascend or descend the carrier board 10 more stably, and the sliding block 17 is provided for supporting the clamping plate 16 and moving the clamping plate 16 more stably.

In addition, the stepper motor driver for mechanical engineering comes with the first spring 6 and the second spring 152. When the two first fixed plates 5 are moved away from each other, the two first springs 6 are shortened to produce an impact force for a buffering effect after the driver is placed onto the carrier board 10. When the clamping plate 16 is moved to the right side, the second spring 152 is shortened. When the first handle 23 is released, the second spring 152 is stretched to move the clamping plate 16 to the left side, so as to facilitate clamping the driver by the clamping plate 16 more conveniently. Obviously, the present invention has the features of compact structure, reasonable design, and high practicality.

While the present invention has been described by means of specific embodiments, numerous modifications and variations could be made thereto by those skilled in the art without departing from the scope and spirit of the present invention set forth in the claims.

What is claimed is:

1. A stepper motor driver for mechanical engineering, comprising a bottom plate, characterized in that the bottom plate has a placing slot formed on the upper surface of the bottom plate, and both sides of the inner wall of the placing slot are fixedly coupled by a first sliding rod, and the first sliding rod has two first sliding sleeves sheathed on a surface of the first sliding rod and engaged with opposite sides of two first fixed plates respectively, and two first springs are sheathed on a surface of the first sliding rod, and both ends of the two first springs are fixedly coupled to the sides of the two first fixed plates away from each other and both sides of the inner wall of the placing slot, and the upper surfaces of the two first fixed plates are fixedly coupled to the lower surfaces of two first rotating devices respectively, and the upper surfaces of the two first rotating devices are fixedly coupled to the lower surfaces of two second rotating devices by two fixed rods respectively, and the upper surfaces of the two second rotating devices are fixedly coupled to the lower surface of a carrier board, and the lower surface of the carrier board is fixedly coupled to the top of four second sliding rods, and the four second sliding rods are disposed at four corners of the lower surface of the carrier board respectively, and a second sliding sleeve is sheathed on the surfaces of four second sliding rods separately, and the four second sliding sleeves are engaged with the upper surfaces of two second fixed plates respectively, and the sides of the two second fixed plate away from each other are fixedly coupled to both sides of the inner wall of the placing slot respectively, and both left and right sides of the carrier board upper surface are fixedly coupled to a third fixed plate, and the sides of two third fixed plates away from each other are fixedly coupled to both left and right sides of the inner wall of the placing slot respectively, inner wall, and the left side of the left third fixed plate is fixedly coupled to the right side of a clamping plate through two telescopic devices, and the lower surface of the clamping plate is fixedly coupled to the upper surface of a sliding block, and the sliding block is slidably coupled into a sliding groove formed on the upper surface of the carrier board, and the upper surface of the bottom plate has a fixed block disposed at a position on the right side of the placing slot, and the upper surface of the fixed block is movably coupled to the upper surface of a cover through two hinges, and lower surface of the cover is coupled to the upper surface of the bottom plate, and right side of the cover is in an arc shape.

2. The stepper motor driver for mechanical engineering according to claim 1, wherein both of the opposite sides of the clamping plate and the left third fixed plate have a protective pad, and the protective pad has a width equal to the width of the first fixed plate and the width of the clamping plate.

3. The stepper motor driver for mechanical engineering according to claim 1, wherein the clamping plate has a first handle disposed on the upper surface of the clamping plate, and the cover has a second handle disposed on the left side of the upper surface, and both of the first handle and the second handle are in a semicircular ring shape.

4. The stepper motor driver for mechanical engineering according to claim 1, wherein each telescopic device comprises a telescopic rod and a second spring, and the second spring is sheathed on a surface of the telescopic rod, and both of the telescopic rod and the second spring are fixedly coupled to the opposite sides of the clamping plate and the right third fixed plate respectively.

5. The stepper motor driver for mechanical engineering according to claim 1, wherein the first rotating device and the second rotating device have the same structure, and the first rotating device comprises two support blocks, and the lower surfaces of the two support blocks in the first rotating device are fixedly coupled to the upper surface of the first fixed plate, and the upper surface of the support block in the second rotating device is fixedly coupled to the lower surface of the carrier board, and opposite sides of the two support blocks are fixedly coupled by a rotating shaft, and a bearing is sheathed on a surface of the rotating shaft, and the upper surface of the bearing in the first rotating device is fixedly coupled to the lower surface of the second rotating device in the bearing through the fixed rod.

6. The stepper motor driver for mechanical engineering according to claim 1, wherein the sliding block in T-shaped and the sliding groove is T-shaped.

\* \* \* \* \*